United States Patent
Thornton, II (10) Patent No.: US 9,684,437 B2
(45) Date of Patent: Jun. 20, 2017

(54) MEMORIZATION SYSTEM AND METHOD

(71) Applicant: Michael L. Thornton, II, Temperance, MI (US)

(72) Inventor: Michael L. Thornton, II, Temperance, MI (US)

(*) Notice: Subject to any disclaimer, the term of this patent is extended or adjusted under 35 U.S.C. 154(b) by 383 days.

(21) Appl. No.: 14/318,877

(22) Filed: Jun. 30, 2014

(65) Prior Publication Data
US 2015/0019973 A1   Jan. 15, 2015

Related U.S. Application Data

(60) Provisional application No. 61/845,554, filed on Jul. 12, 2013.

(51) Int. Cl.
*G09B 19/00* (2006.01)
*G06F 3/0484* (2013.01)
(Continued)

(52) U.S. Cl.
CPC ........... *G06F 3/04842* (2013.01); *G09B 5/00* (2013.01); *G09B 7/00* (2013.01); *G09B 5/04* (2013.01);
(Continued)

(58) Field of Classification Search
CPC . G09B 19/04; G09B 5/04; G09B 7/00; G09B 17/006; G09B 19/06; G09B 5/00; G06F 3/04842
(Continued)

(56) References Cited

U.S. PATENT DOCUMENTS 4,972,485 A * 11/1990 Dautrich ................. G10L 15/07
704/242
5,302,132 A * 4/1994 Corder ..................... G09B 5/14
345/173
(Continued)

FOREIGN PATENT DOCUMENTS

WO   0169576 A1   9/2001

OTHER PUBLICATIONS

Memorize with System, Remember Me Bible Verse Memory, http://www.amazon.com/Remember-Me-Bible-Verse-Memory/dp/B004JPXEK0.
(Continued)

*Primary Examiner* — Jack Yip
(74) *Attorney, Agent, or Firm* — Ward Law Office LLC; Jacob M. Ward (57) ABSTRACT

A system for memorization of content includes a memory storing the content. The memory includes a tangible computer readable medium with an instruction set, and at least one database. The database has information corresponding to the content. A processor communicating with the memory is configured to: execute the instruction set to present information corresponding to an original discrete portion of the content, and conduct an accuracy analysis of at least one version of the discrete portion audibly repeated by a user. An audio input device communicating with the processor receives the version from the user for use in the accuracy analysis by the processor. An input device inputs a user predetermined quantity of repetitions of the version presented to the user prior to the user progressing to a next discrete portion of the original discrete portion when a user predetermined accuracy threshold of the accuracy analysis is met.

7 Claims, 9 Drawing Sheets

(51) Int. Cl.
*G09B 5/00* (2006.01)
*G09B 7/00* (2006.01)
*G09B 17/00* (2006.01)
*G09B 5/04* (2006.01)
*G09B 19/06* (2006.01)
*G09B 19/04* (2006.01)

(52) U.S. Cl.
CPC ............ *G09B 17/006* (2013.01); *G09B 19/04* (2013.01); *G09B 19/06* (2013.01)

(58) Field of Classification Search
USPC .................... 434/236, 157; 704/251; 381/56
See application file for complete search history.

(56) References Cited

U.S. PATENT DOCUMENTS

| | | | | |
|---|---|---|---|---|
| 6,525,255 B1* | 2/2003 | Funaki | ................... | G10H 3/125 |
| | | | | 84/616 |
| 8,390,447 B2 | 3/2013 | Guard | | |
| 2002/0116196 A1* | 8/2002 | Tran | ...................... | G06F 1/3203 |
| | | | | 704/270 |
| 2003/0028378 A1 | 2/2003 | August et al. | | |
| 2007/0134631 A1* | 6/2007 | Hardy | ....................... | G09B 7/02 |
| | | | | 434/236 |
| 2008/0021852 A1* | 1/2008 | Williams | .................. | G09B 5/00 |
| | | | | 706/25 |
| 2008/0254419 A1 | 10/2008 | Cohen | | |
| 2010/0021871 A1* | 1/2010 | Layng | ....................... | G09B 7/02 |
| | | | | 434/178 |
| 2011/0112672 A1* | 5/2011 | Brown | ................. | G10H 1/0025 |
| | | | | 700/94 |
| 2011/0275048 A1 | 11/2011 | Hussain | | |
| 2011/0320198 A1 | 12/2011 | Threewits | | |
| 2012/0329013 A1 | 12/2012 | Chibos | | |
| 2013/0143183 A1* | 6/2013 | Zilberman | ............... | G09B 5/06 |
| | | | | 434/157 |
| 2013/0295535 A1* | 11/2013 | Levy | .................... | G09B 17/006 |
| | | | | 434/169 |

OTHER PUBLICATIONS

Quran Memorization Program for iPad on the iTunes App Store, https://itunes.apple.com/us/app/quran-memorization-program/id537250410?mt=8.

* cited by examiner

FIG. 1

SELECT CONTENT DISPLAY FORMAT
- # OF WORDS       [0]
- # OF PHRASES     [1]
- # OF SENTENCES   [0]
- # OF LINES       [0]

FIG. 2

SELECT METHOD TO REMOVE CONTENT PRESENTATION
- TIME IN SECONDS   [0]
- # OF REPETITIONS  [3]
- START BUTTON      ◯

FIG. 3

SELECT METHOD OF WHEN APPLICATION RESPONDS TO USER INPUT
- REAL TIME EVALUATION    ◯
- DETECT SILENCE          ◯  [0]
- PRESS DONE BUTTON       ◯
- DETECT # OF WORDS SAID  ◯

FIG. 4

SELECT METHOD OF APPLICATION RESPONSE
- "YOU SAID"                   ◯
- "THE CORRECT RESPONSE IS"    ◯
- "CORRECT/INCORRECT"          ◯
- HIGHLIGHT/UNDERLINE MISTAKES ◯

SELECT WHEN APPLICATION MOVES TO NEXT
DISCRETE PORTION OF CONTENT

\# OF REPITITIONS WITH ACCURACY   ◯
THRESHOLD MET

NEXT BUTTON   ◯

FIG. 5

SELECT HOW CONTENT IS COMPILED AS
USER PROGRESSES

ISOLATED DISCRETE PORTIONS   ◯

PROGRESSIVE DISCRETE PORTIONS   ◯

PROGRESSIVE DISCRETE PORTIONS   ◯
WITH INCREMENTAL REVIEW

FIG. 6

SELECT ACCURACY THRESHOLD

ACCURACY THRESHOLD   [ 98% ]

FIG. 7

SELECT CONTENT TO BE MEMORIZED

RECENTLY VIEWED CONTENT   ◯
DOWNLOAD   ◯
IMPORT   ◯
PASTE IN   ◯

MEMORIZATION SYSTEM AND METHOD

CROSS-REFERENCE TO RELATED APPLICATIONS

This application claims the benefit of U.S. Provisional Application No. 61/845,554, filed on Jul. 12, 2013. The entire disclosure of the above application is incorporated herein by reference.

FIELD

The present disclosure relates to a system and method for facilitating the memorization of content using audio input.

BACKGROUND

It is known that flash card and individual pages of a book do not allow content to be presented to a user based on accuracy and progress through a portion of text. Additionally, the use of audio feedback in memorization has typically required two persons, including one providing the audio input and another for analyzing the audio feedback.

Known systems and methods dealing with the memorization of content include: U.S. Pat. Appl. Pub. No. 2011/0275048 to Hussain; U.S. Pat. Appl. Pub. No. 2003/0028378 to August et al.; U.S. Pat. Appl. Pub. No. 2008/0254419 to Cohen; and "Remember Me Bible Verse Memory," last accessed at http://www.amazon.com/Remember-Me-Bible-Verse-Memory/dp/B004JPXEK0. However, these systems and the methods of their use have been found unsatisfactory or otherwise undesirable for purposes of memorization.

There is a continuing need for a system and method in which content is presented audibly and visually and repeated by a user. Desirably, the system facilitates the memorization of content using audio input.

SUMMARY

In concordance with the instant disclosure, a system and method in which content is presented audibly or acoustically and/or visually and repeated by a user, and which facilitates the memorization of content using audio input, is surprisingly discovered.

In one embodiment, a system for memorization includes a memory, a processor, an audio input device, and a display. The memory includes a tangible computer readable medium with an instruction set and at least one database embodied thereon. The database has information corresponding to content to be memorized. The processor is in communication with the memory, and is configured to execute the instruction set to visually present information corresponding to content. The processor also conducts an accuracy analysis for audibly repeated content relative to the content. The audio input device is in communication with the processor. The audio input device receives the audibly repeated content from a user for the accuracy analysis by the processor. The display is also in communication with the processor. The display is configured for showing the information corresponding to the content, and for also showing results of the accuracy analysis to the user.

The system may further include a human interface device such as a keyboard, mouse, or touch screen. The human interface device is in communication with the processor and permits the user to at least one of select the content, provide the content, set an accuracy threshold, and identify discrete portions of the content for memorization.

In a particular embodiment, the disclosure includes a computer-implemented system and method for assisting with memorization of content such as a particular piece of information, topic, or document. The system and method is especially useful for memorization of Bible verses, speeches, songs, and poems, but is not limited to these types of content. The system permits a user to select or provide the content and identify discrete portions thereof for memorization. The user is also allowed to identify a number of repetitions per discrete portion, and how to compile the discrete portions upon satisfying an accuracy threshold selected by the user. The system then presents the discrete portions to the user.

In operation, the user repeats the presented content audibly or acoustically, and the system receives and converts the audible or acoustic content from the user using speech-to-text input features. Feedback is then provided to the user. In order to provide feedback, the system compares the selected discrete portion with content received from the user, and calculates a percentage accuracy. The percentage accuracy is compared with the threshold accuracy chosen by the user, and the presentation of the content is repeated if the accuracy threshold is not satisfied. All aspects of the presentation of content and feedback are selected by the user, including whether the presentation will be visual, audio, or both.

In an exemplary embodiment, the disclosure includes a computer-implemented method for assisting with memorization of content (e.g., information, a topic, or a document). It is particularly useful for memorization of Bible verses, speeches, songs, poems, etc., but is not limited to these types of content. The method presents the content to the user, receives user responses repeating the content, and provides feedback to assist the user in memorizing the content.

The method provides steps that can include:

Step 1) Optionally, permit the user to select content or provide content for memorization;

Step 2) Optionally, permit the user to set an accuracy threshold for when the user repeats the content;

Step 3) Optionally, permit the user to identify discrete portions of content for memorization, as well as number of repetitions per discrete portion, and how to compile the discrete portions upon satisfying the accuracy threshold;

Step 4) System presents a first discrete portion to the user according to constraints of step 3, the presentation being visual, audio, or both;

Step 5) User audibly repeats the first discrete portion of the content;

Step 6) The audible repetition of the first discrete portion of the content is received by the system as a version of the first discrete portion of the content;

Step 7) The system converts the version of the received first discrete portion of the content to text, using a speech-to-text engine;

Step 8) The system compares the version of the received first discrete portion of the content converted to text to an original content of the text, and calculates a percentage accuracy of the version to the original content of the text;

Step 9) The system notifies the user of the percentage accuracy;

Step 10) The system compares the percentage accuracy to the accuracy threshold and compiles the version for review by the user; and Step 11) If the accuracy threshold is:

a) satisfied, then the method presents a second discrete portion of the content and repeats steps 5-10 with the additional content, or the method ends if no more content is available; or b) not satisfied, then steps 4-10 are repeated until the accuracy threshold is satisfied.

DRAWINGS

The above, as well as other advantages of the present disclosure, will become readily apparent to those skilled in the art from the following detailed description, particularly when considered in the light of the drawings described hereafter.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise stated.

The disclosure includes a computer-implemented system and method for assisting with verbatim memorization of content (e.g., information, a topic, a document, a set of acoustic tones or musical notes, mathematical equations, items of the periodic table of elements, anatomical items such as bones organs of the human body) including any sequence of elements. It is particularly useful for memorization of Bible verses, speeches, songs, poems, etc., but is not limited to these types of content.

The format of the presentation of material will be selected through user configurations of the application. The user may choose to utilize the application with a set of default configurations provided in the application. The user may save specific configurations set in FIGS. 1 through 10 for future use.

Figure 1:
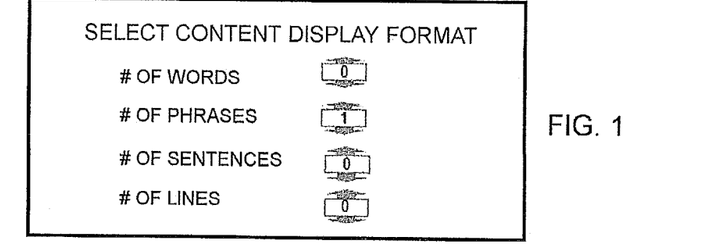
FIG. 1 is a front elevation view of a display for selecting a format for displaying content of the present disclosure.

Referring to FIG. 1, in one system-provided screen the user may select and thereby direct a size or amount of the content in an initial presentation of the material to be memorized. This can include selecting such as by a quantity of words, a quantity of phrases, a quantity of sentences, a quantity of lines, or the like. This level of selection allows the user to choose a repetitive quantity of the original content the user is comfortable memorizing at each step. For example, if the user is comfortable memorizing up to 6 words at a time, but has difficulty memorizing more than 6 words at a time, a quantity of 6 words of content can be pre-selected for each group of words to be memorized. As a further example, if the content is originally divided by phrases within quotation or other punctuation marks, the user can select the content to be presented by phrase. If user memorization is optimum using partial or entire sentences, this criteria can also be selected.

Figure 2:
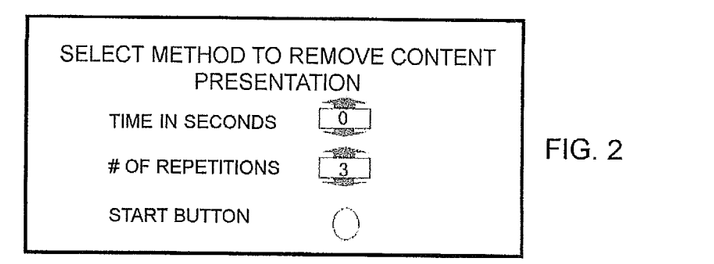
FIG. 2 is a front elevation view of a display for selecting a method to remove content.

Referring to FIG. 2, in another system-provided screen the user may select and thereby direct how the content in the initial presentation is removed before allowing the user to input the memorized content. This can include selecting content removal using as a designator a time in seconds, or by a number of repetitions of the content. For example, the user can select a period of 30 seconds providing a delay period prior to inputting a user version of the memorized content. The user can also select a quantity such as 3 repetitions of the presented content, providing the user 3 opportunities to correctly repeat the provided content to a threshold degree of accuracy before the system moves forward to a next segment of the content. This precludes the content from being endlessly repeated if the accuracy threshold is not met for a given portion of the content.

Figure 3:
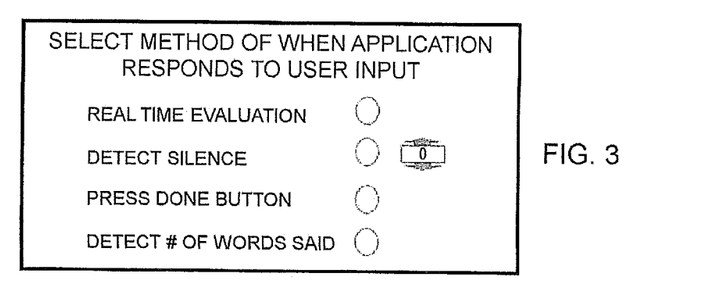
FIG. 3 is a front elevation view of a display for selecting a method for identifying when the application responds to user input.

Referring to FIG. 3, in another system-provided screen the user may select when the application responds to user input. The system provides for a real time evaluation such that as each "word" is said, the system compares the word to the original content or text and each word is marked either correct or incorrect, thereby providing a word-by-word evaluation. This can include selecting application response such as by the system detecting a period of silence from the user, for example in a time period such as in seconds, or by the system detecting a quantity of words said by the user.

Figure 4:
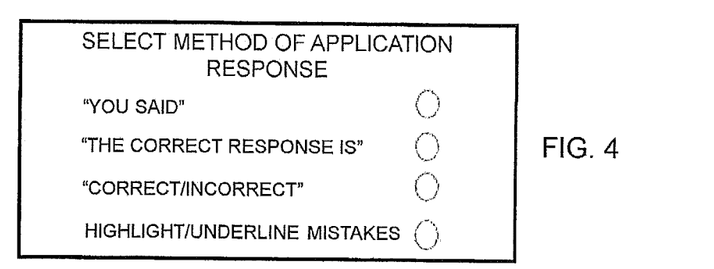
FIG. 4 is a front elevation view of a display for selecting a method for application response.

Referring to FIG. 4, the user may also configure how the content is repeated back to the user, including by human interface such as by sight, sound or vibration. The content can also be displayed back to the user, after the application analyzes the user's response. This can include repeating the user's response, identifying a correct response by comparing a version of the user's response to an original content, identifying portions of the user's response that were either correct or incorrect, or by signifying in a visual presentation by highlighting or underlining in the repeated response those items that are incorrect or mistakes.

Figure 5:
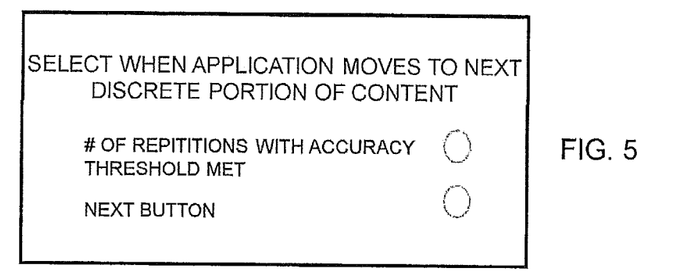
FIG. 5 is a front elevation view of a display for selecting a method for identifying when the application moves to a next discrete portion of the content.

Referring to FIG. 5, when the user has repeated the original content to an acceptable measure, such as by achieving a pre-determined percentage of accuracy, or pre-determined accuracy threshold, between the repeated response and the original content, the user may then select in a further screen when the application stops repeating the original response and moves to a next discrete portion of the content. This can be accomplished as previously noted for example by the user specifying or inputting a quantity of repetitions of the repeated responses before the system moves to a next discrete portion of the content, if the accuracy threshold set by the user is not met.

Figure 6:
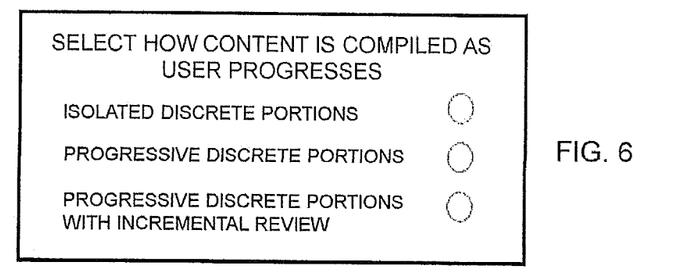
FIG. 6 is a front elevation view of a display for selecting how the content is compiled as the user progresses.

Referring to FIG. 6, in a further screen the user may also select the method by which the content is compiled and displayed back to the user for review as the user progresses through the content. For example, the content can be provided as individual discrete portions of the original content, and repeated until the accuracy threshold for any one of the discrete portions is achieved. The content can also be provided cumulatively, as a first discrete portion repeated until the accuracy threshold is achieve, with a second discrete portion then added to the first discrete portion, and the combination repeated until the accuracy threshold is achieved for the cumulative group of the first and second discrete portions. Third, fourth and more discrete portions can then be added. The content can also be repeated as progressive discrete portions where each repetition adds more content, with an incremental review of the material providing the previous content plus the additional content until the accuracy threshold is achieved.

Figure 7:
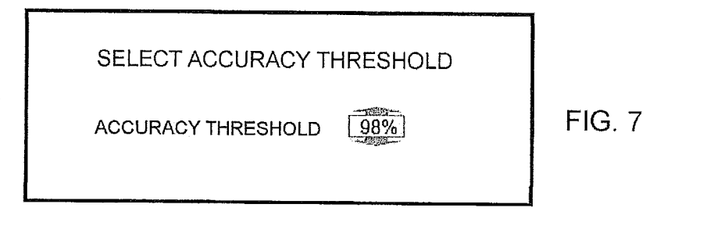
FIG. 7 is a front elevation view of a display for selecting an accuracy threshold.

Referring to FIG. 7, using a further screen the user may select the accuracy threshold as a percentage of the original content at which the application considers the user's input to be correct. A percentage between zero and one hundred percent can be identified and selected.

The material to be memorized in the present application may be provided with the system or selected from multiple other sources. The application may include specific documents or links to information. The application may also allow users to import or download new or additional material. The application may also provide access or a connection to a third party for purchase of additional material. The identification and input of material can be via WIFI, the Internet, direct connection to an outside computer, or the like.

Figure 8:
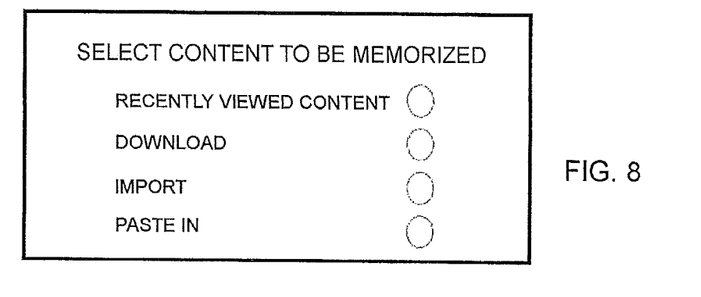
FIG. 8 is a front elevation view of a display for selecting the content to be memorized.

Referring to FIG. 8, after the programming steps of FIGS. 1-7 are completed, the application then allows the user to select a particular piece of information, topic, or document that they choose to memorize. The user may select the content to be memorized from a set of material saved in or added to an application memory. This can include selecting content from recently viewed content, content to download as identified by the user, content to import and memorize, content to type in, or content to paste in.

Figure 9:
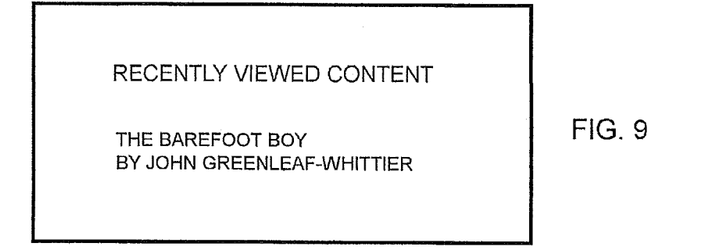
FIG. 9 is a front elevation view of an exemplary display of recently viewed content.

Referring to FIG. 9, an exemplary output or screen is presented to the user when the command to identify recently viewed content presented and described in reference to FIG. 8 is selected.

Figure 10:
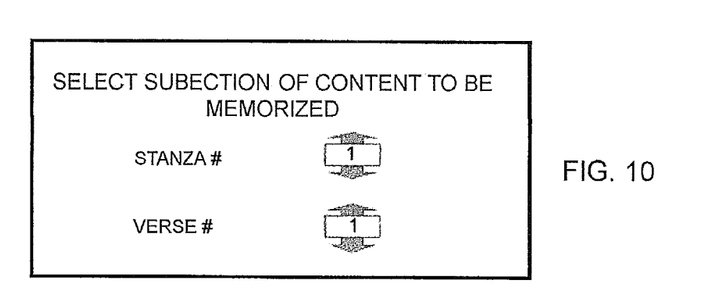
FIG. 10 is a front elevation view of a display for selecting a subsection of the content to be memorized.

Referring to FIG. 10, the user may further select a subsection of the content to be memorized. As a subsection example, a particular stanza of material can be selected.

Figure 11:
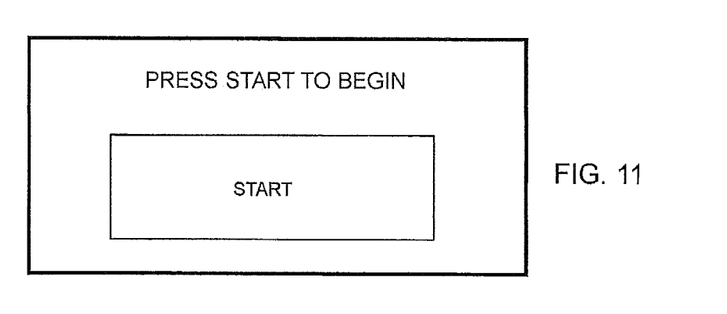
FIG. 11 is a front elevation view of a display presenting a system start button.

Referring to FIG. 11, after all of the selections are made that are identified in FIGS. 1-10, the user initiates the start of a memorization session using a screen prompted start button.

Figure 12:
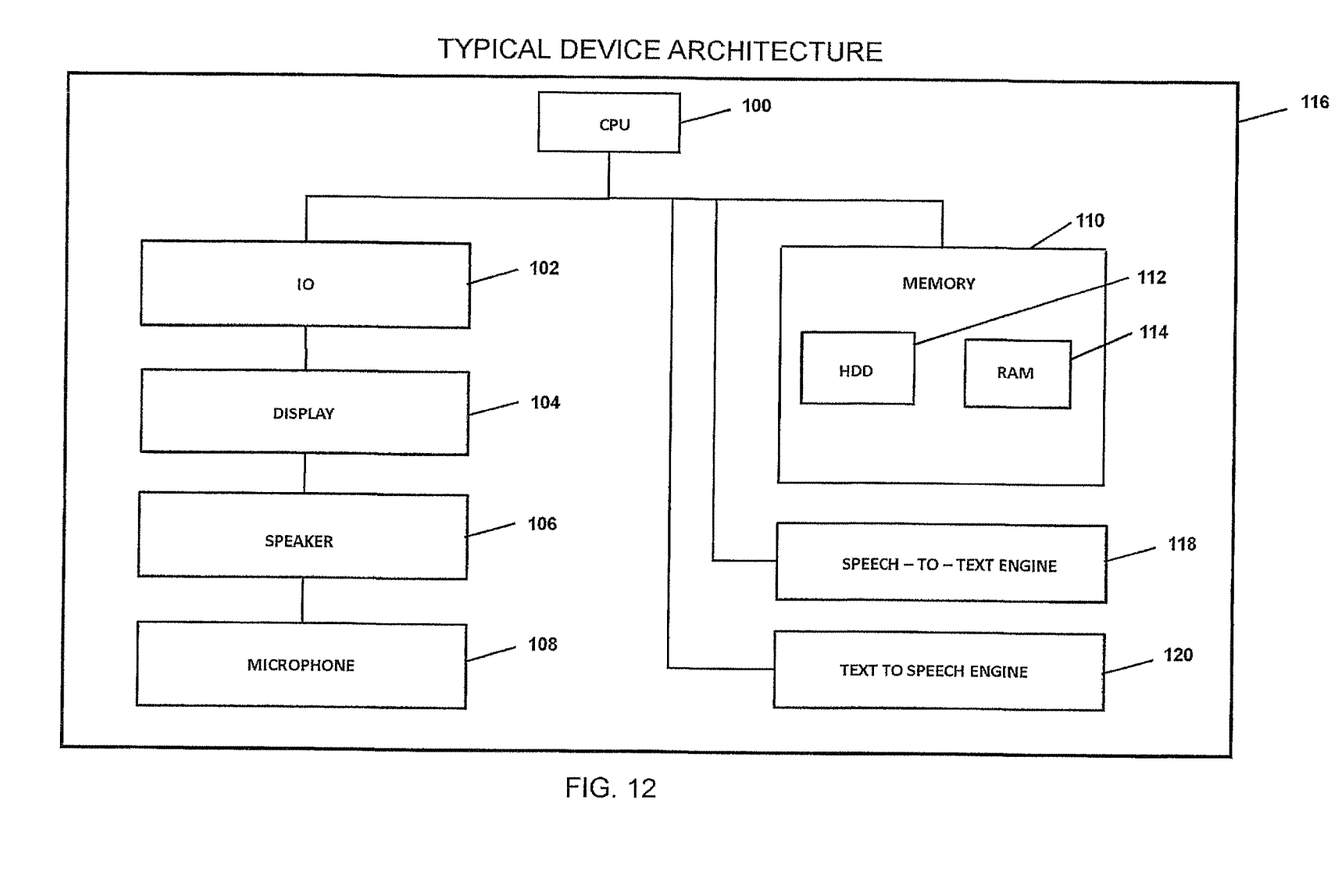
FIG. 12 illustrates an exemplary device architecture for use with the system according to one embodiment of the disclosure.

Referring to FIG. 12, a device architecture can include a central processing unit (CPU) 100, an input/output device 102 communicating with the CPU 100, which can include a human interface such as a display 104, a speaker 106, and a microphone 108. The memory 110 is in communication with the CPU 100. The memory 110 can include a HDD 112 and a RAM 114. A device 116 can include all of the above architecture items internally, or some of the items may be external to the device 116 and connected to the device 116 either permanently or be releasable from the device 116.

A typical input of memorized material from the user will use the audible voice of the user. This input will normally be accepted through one of the input/output devices 102 such as the microphone 108 connected to the device 116, either internally or externally.

A speech-to-text engine 118 included with the device 116 converts the user's voice to text for analysis by the application. A text-to-speech engine 120 then converts the text to simulated speech. Typical output from the application and device 116 will therefore be a simulated voice generated by the text-to-speech engine 120 presented from the speaker 106 in the device 116. Alternately, output from the application and device 116 will be presented via the visual display 104 of the device 116.

According to one embodiment of the disclosure, a system for memorization includes a content to be memorized stored in a memory. A processor is in communication with the memory. The processor is configured to: present an original discrete portion of the content; conduct an accuracy analysis of at least one version of the discrete portion of the content audibly repeated by a user by comparing the at least one version to the original discrete portion of the content; and compile the at least one version for review by the user. An input device is provided for inputting a user predetermined quantity of repetitions of the at least one version of the discrete portion presented to the user prior to the user progressing to a next discrete portion of the original discrete portion when a user predetermined accuracy threshold of the accuracy analysis is met.

According to another embodiment of the disclosure, a system for memorization has a memory. The memory may include a tangible computer readable medium with an instruction set and at least one database embodied thereon, the database having information corresponding to a content to be memorized. A processor is in communication with the memory. The processor is configured to execute the instruction set to present information corresponding to an original discrete portion of the content, to conduct an accuracy analysis of at least one version of the discrete portion of the content audibly repeated by a user, and compile the at least one version when a user predetermined accuracy threshold of the accuracy analysis is met. An audio input device in communication with the processor receives the at least one version of the discrete portion of the content from the user for use in the accuracy analysis by the processor. An input device is provided for inputting a user predetermined quantity of repetitions of the at least one version of the discrete portion presented to the user prior to the user progressing to a next discrete portion of the original discrete portion.

According to a further embodiment of the disclosure, a method for memorization includes the steps of:

(a) providing a memory including a tangible computer readable medium with an instruction set and at least one database embodied thereon, the database having information corresponding to a content to be memorized;

(b) providing a processor in communication with the memory, the processor configured to execute the instruction set to present information corresponding to the content, and for conducting an accuracy analysis of the content audibly repeated by a user;

c) selecting a discrete portion of the content for memorization;

d) identifying an accuracy threshold for use in the accuracy analysis conducted on a user repeated at least one version of the original discrete portion of the content;

e) inputting a user predetermined threshold quantity of repetitions of the at least one version presented to the user prior to the user progressing to a next discrete portion of the original discrete portion when the accuracy threshold of the accuracy analysis is met;

f) presenting the discrete portion to the user, the presentation being visual, audio, or both;

g) receiving input of an audible repetition by the user of the version of the original discrete portion of the content; and h) conducting the accuracy analysis on the version and compiling the audible repetition for review by the user.

In FIGS. 13-20, an exemplary operation of the system is presented. This operation is not limiting, as multiple different operations are possible based on the selections made by the user described in the figures above.

Figure 13:
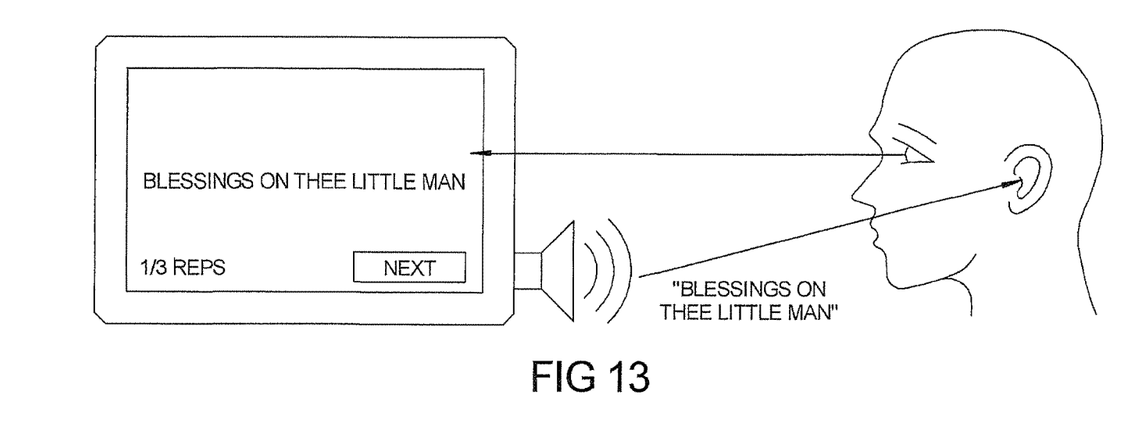
FIGS. 13-20 collectively illustrate an operation of the system according to one embodiment of the disclosure.

Referring to FIG. 13, the user is presented with a discrete portion of an original portion of material to be memorized.

Figure 14:
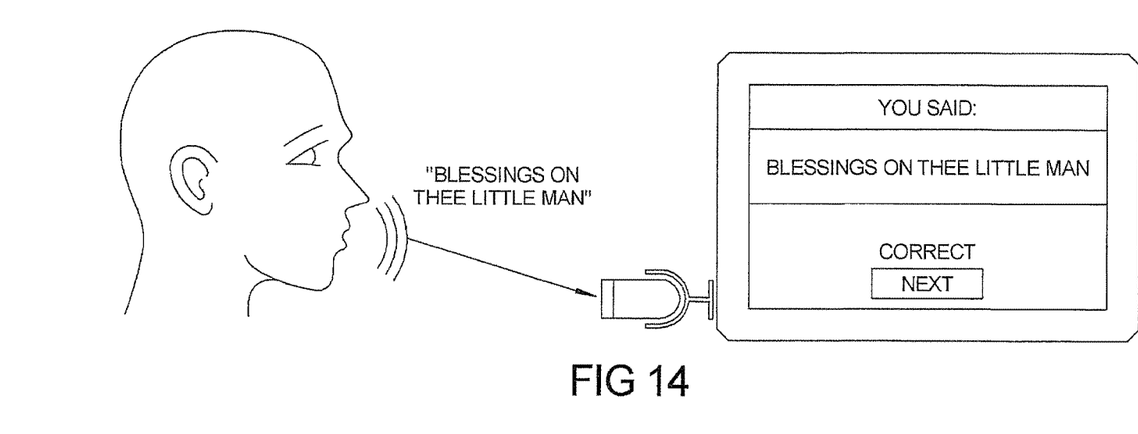

Referring to FIG. 14, the presentation of the discrete portion of the material ends after a user pre-specified duration. The user will then, from memory, input the discrete portion of the material back to the application as a user's memorized "version" of the discrete portion of the original material.

The application then conducts an analysis of the user's memorized version or input, and determines whether that input matches the presented original discrete portion of the material. The analysis also identifies whether less than 100% of the user's input is accurate defined as a user predetermined percentage of the user's input which matches the presented original discrete portion of the material. The application will then output a response to the user based on the results of the analysis, including whether the response is correct, and optionally identify a percentage of the user's input that is correct, if less than 100%. The response presented to the user can be in multiple forms, including but not limited to presentation of accurate versus inaccurate words by highlighting, by using different colors, differentially identifying for example by text changes, presenting only the accurate or only the inaccurate words, or presenting an audible response identifying the accurate or only the inaccurate words and/or an audible response together with a visual screen showing the words. The response can also include a percentage number presenting the percentage of correct words identified by the accuracy calculation.

Figure 15:
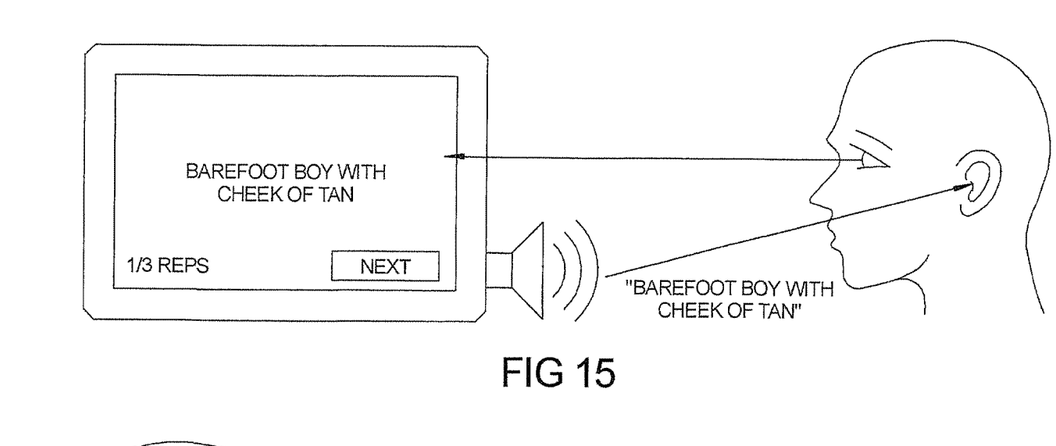

Referring to FIG. 15, once the preselected accuracy threshold is met for the first or any one of the discrete portions of the material, the application will move to a second or a next discreet portion of content to present to the user.

Figure 16:
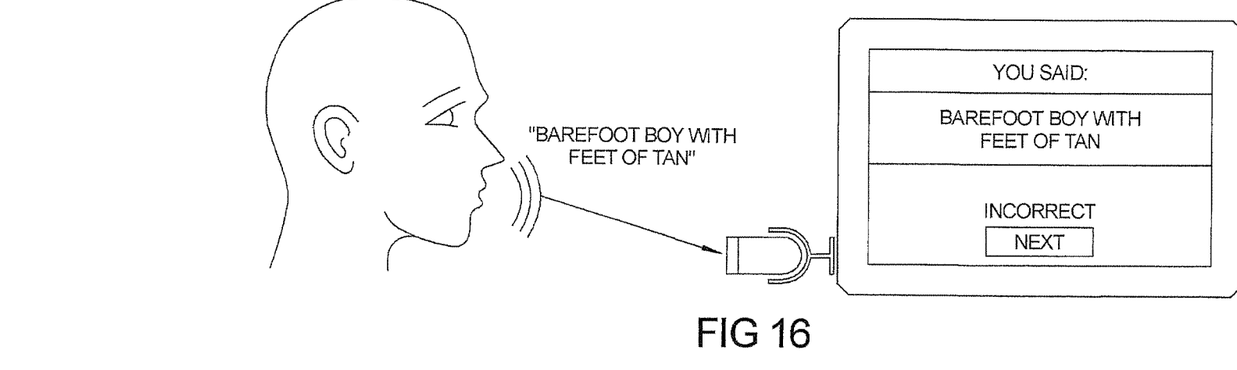
Figure 17:
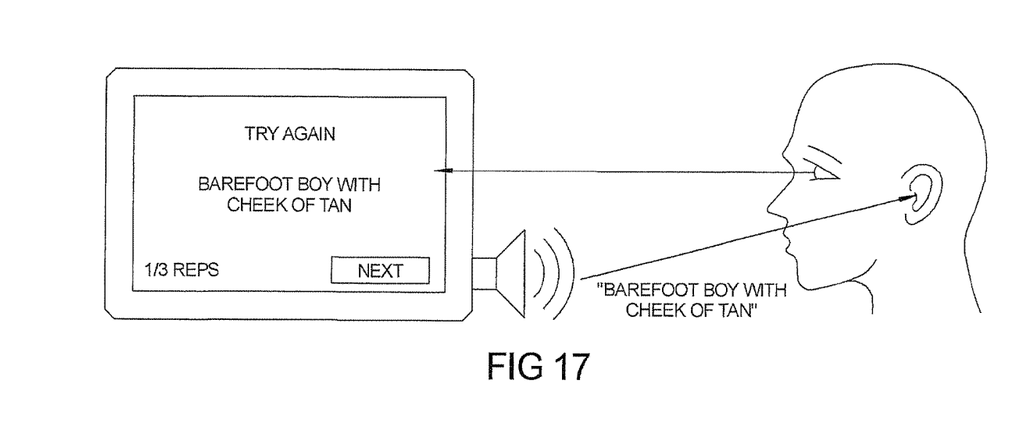
Figure 18:
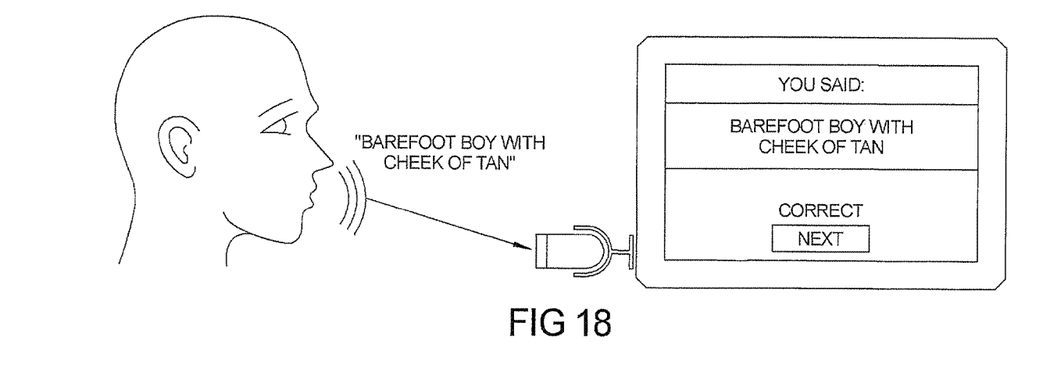

Referring to FIGS. 16-18, the user then repeats the second or the next discrete portion of the material, and, if the result of the analysis of the second or the next discrete portion of the content does not meet the preselected accuracy criteria, some portion of the original material may be presented to the user again.

Figure 19:
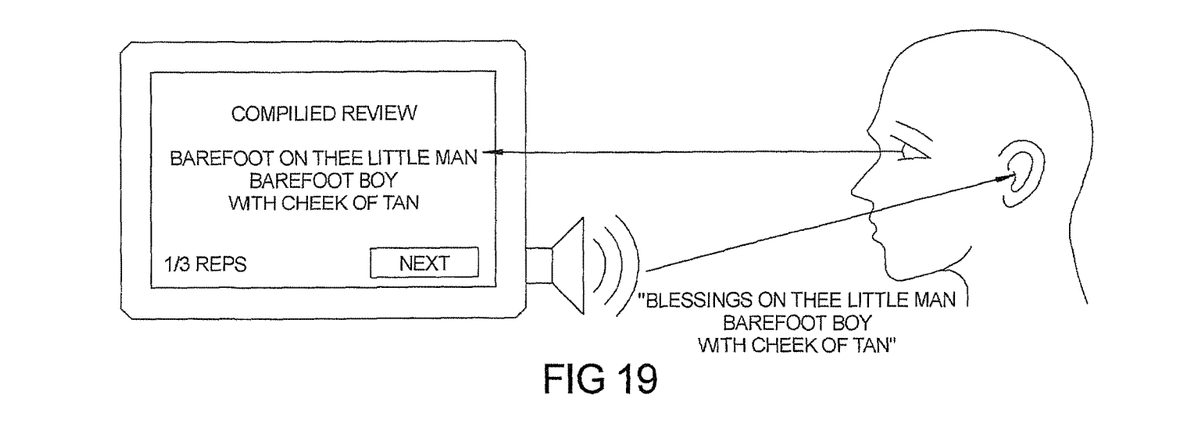
Figure 20:
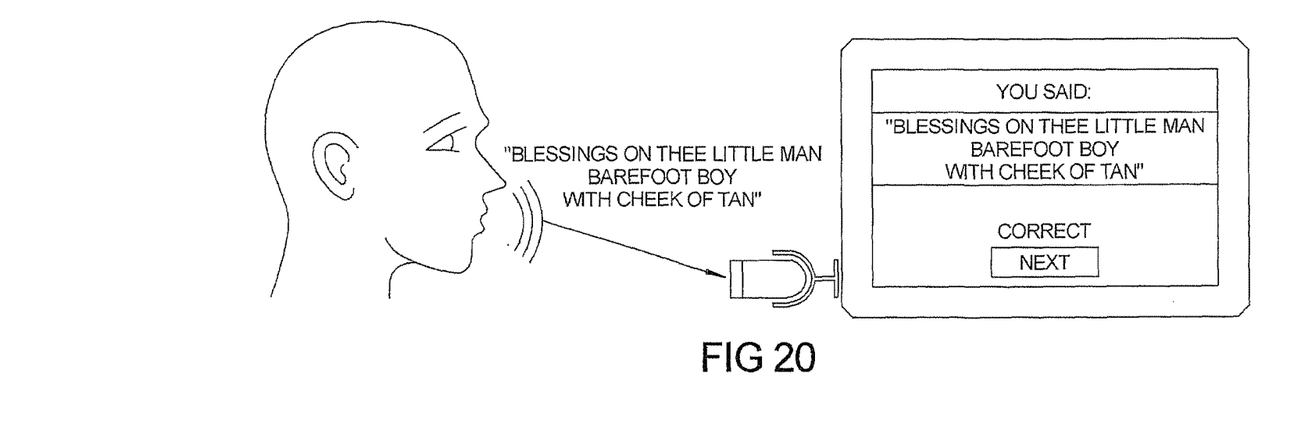

Referring to FIGS. 19-20, the user can review and then repeat both the first and second discrete portions together.

Figure 21:
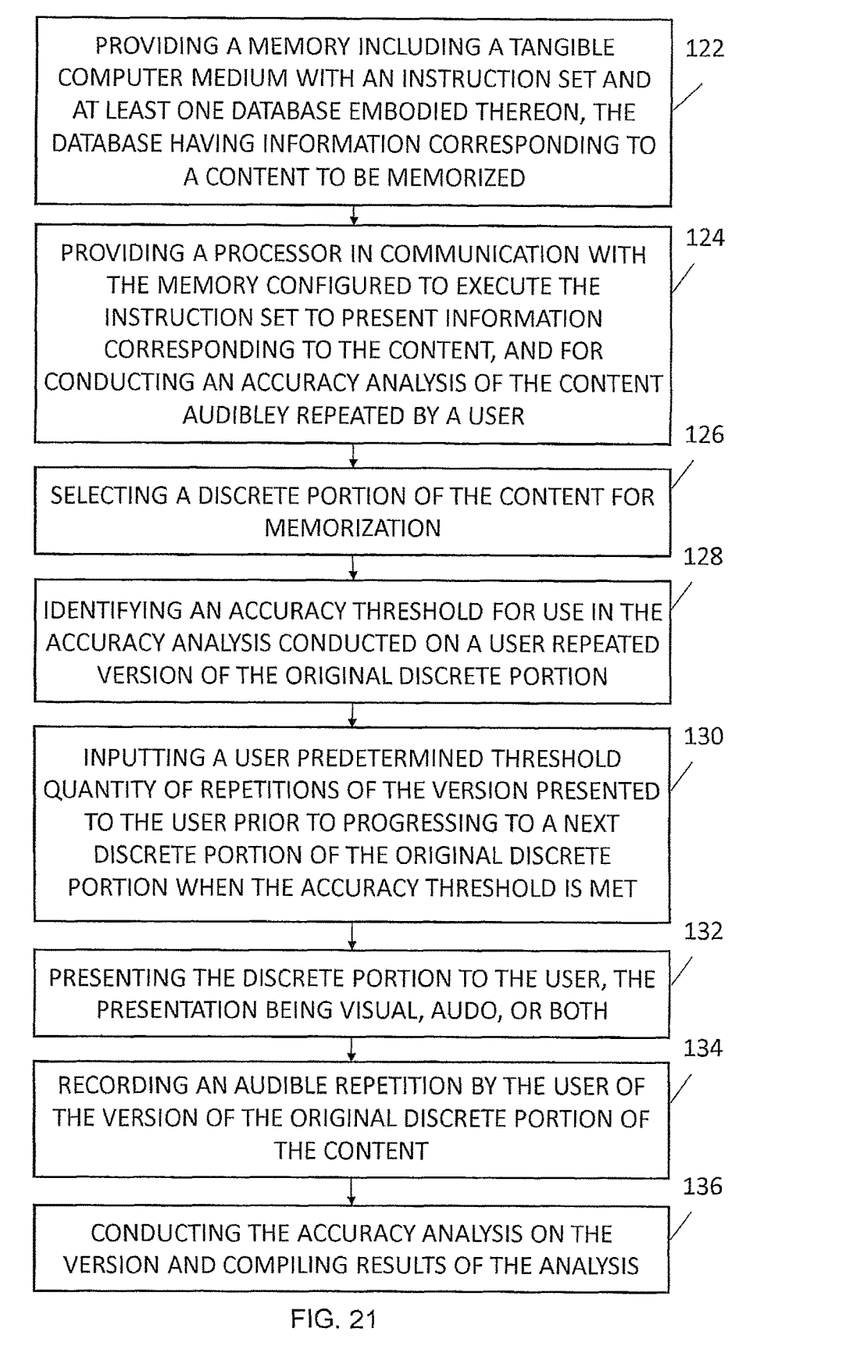
FIG. 21 is a flow diagram of the method steps performed by the system according to one embodiment of the disclosure.

Referring to FIG. 21, a method of operating the system 10 has multiple steps. In a step 122 the method includes providing a memory including a tangible computer readable medium with an instruction set and at least one database embodied thereon, the database having information corresponding to a content to be memorized. In a step 124, the method includes providing a processor in communication with the memory, the processor configured to execute the instruction set to present information corresponding to the content, and for conducting an accuracy analysis of the content audibly repeated by a user. In a step 126, the method includes selecting a discrete portion of the content for memorization. In a step 128, the method includes identifying an accuracy threshold for use in the accuracy analysis conducted on a user repeated at least one version of the original discrete portion of the content. In a step 130, the method includes inputting a user predetermined threshold quantity of repetitions of the at least one version presented to the user prior to progressing to a next discrete portion of the original discrete portion when the accuracy threshold of the accuracy analysis is met. In a step 132, the method includes presenting the discrete portion to the user, the presentation being visual, audio, or both. In a step 134, the method includes receiving input of an audible repetition by the user of the version of the original discrete portion of the content. In a step 136, the method includes conducting the accuracy analysis on the version and compiling the audible repetition for review by the user.

The present application can be used on various types of hardware, including but not limited to personal computers, tablets, mobile electronic devices, and custom hardware solutions designed specifically for the utilization of this software application.

The following presents improvements of the present disclosure over known systems. No known system provides all of the following distinguishing method elements, including:

A method to assist a user in verbatim memorization of text by presenting a discrete portion of selected content to the user in a selected format; tracking the accuracy at which the user repeats the discrete portion of the content back to the application; presenting a user's version of the discrete portion of the content to the user based on an accuracy of the user's response; and permitting the user to identify a quantity of repetitions of the user's version of the discrete portion, and compiling repeated content for review as the user progresses through at a predetermined/accepted accuracy threshold.

These features allow a single user to memorize and repeat content through the application interface without the need of a second human to verify and record the accuracy. A further description of the application is as follows.

I. General Description

The application will allow a user to select a particular piece of information, topic or document that they choose to memorize. The user will then be presented with a discrete portion of the original material to be memorized. The presentation of the material ends after a specified duration, and the user will, from memory, input the discrete portion of the material back to the application as a user's version of the discrete portion. The application then analyzes the user's version and determines if that input matches the presented or original portion of the material. The application will then output a response to the user based on the results of the analysis. If the results of the analysis do not meet certain preselected criteria, some portion of the original material may be presented to the user again.

All the aspects of the format of the presentation of material will be selected through user configurations of the application. The user will determine the amount of content in the initial presentation of the material. The user will also be able to configure how the content is repeated or displayed back to the user, after the application analyzes the user's response.

The material available for memorization in the application may be from multiple sources. The application may include specific documents or links to information. The application may allow users to import or download material. The application may also provide access or a connection to a third party for purchase of additional material.

The application may be packaged with materials in several ways. For example, a state capital memorization application may include a textual document containing only a list of states and their capitals. The application may also contain modules of content such as a module of vocabulary word definitions, a module of spelling words and/or a module with a list of world history events and their dates. There will be various ways to apply these methods including, but not limited to: an anatomy application with visual cues (e.g., "What bone is this?"), a Bible verse memory application, an application that assists actors in memorizing lines for a play or TV show, an application that is used to memorize speeches or songs, an application having scientific data such as elements of the periodic table of elements, mathematical equations, or the like.

II. Interface

As previously noted, the typical input of memorized material from the user will be by the audible voice of the user. A speech-to-text engine converts the user's voice to text. A text-to-speech engine then converts the text to simulated speech. The typical output from the application can be a simulated voice from a speaker in the device or a visual display on the device.

III. Example of the Application

The user chooses to memorize a poem. The user selects the desired content from content provided within the application, and selects how to present discrete portions of the content for memorization. The user also selects a number of repetitions of each discrete portion will be performed before a next discrete portion is added, and selects an accuracy threshold of the repeated portions to meet before the next discrete portion is added. An initial presentation of the first discrete portion of the content is begun and a textual display on the screen reads:

"Roses are red, violets are blue."
"Sugar is sweet and so are you."

Simulated speech through the device's speaker vocalizes the same text for the user to hear.

The textual display and the simulated voice stop after either a user specified time or the user predetermined number of repetitions is met. If the user then vocally repeats, from memory, the words: "Roses are blue, violets are red" the application analyzes the spoken words of the user and determines that they are incorrect. The application responds to the user through a simulated voice: "The correct words are Roses are red, violets are blue."

Based on the user configuration, the incorrect phrase is repeated until the user vocalizes the content to the preselected accuracy threshold, and/or the incorrect phrase will be repeated the number of times preselected by the user as described in FIG. 5. Once the discrete portion is memorized by the user to the preselected accuracy threshold, the application will move to the next discrete portion of the content to be memorized and start the process from the beginning. The user also pre-selects how the system compiles and presents the discrete portions for repetition back to the user prior to and after meeting the accuracy threshold. The preselected accuracy percentage for the accuracy threshold is predetermined by the user. For example the user can select a percentage of accuracy of 70%, meaning the process will repeat until at least 70% of the content is accurately repeated by the user. The user designated percentage of accuracy can vary between 0% and 100%. To avoid repeated presentations not meeting the accuracy threshold, the user can also pre-select a number of times an incorrect phrase is repeated. For example, the user can select a preselected number of 3 times to repeat an incorrect phrase before the process moves to the next portion of content.

Several advantages are provided by the present system. The system permits a user to select a quantity of repetitions of individual discrete portions of an original content that will be presented to the user. The system further permits the user to select how the system compiles the individual and combined discrete portions of the original content prior to and after meeting an accuracy threshold for presentation to the user, allowing the user to personalize the system responses for easiest memorization.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for memorization of content, comprising:
a human interface for selecting the content to be memorized and for inputting a user predetermined i) quantity of repetitions of an original discrete portion of the content to be presented to the user prior to the user progressing to a next discrete portion of the content, and ii) percentage accuracy threshold;
a memory on which the content to be memorized is stored, wherein the memory is a tangible computer readable medium with an instruction set and at least one database embodied thereon;
a processor in communication with the human interface and the memory;
a display in communication with the processor, wherein the processor is configured to cause the display to visually present the original discrete portion of the content as text corresponding with the original discrete portion of the content prior to the original discrete portion of the content being audibly repeated by the user;
a speaker in communication with the processor,
a text-to-speech engine in communication with the processor, wherein the text-to-speech engine is configured to convert the text corresponding with the original discrete portion of the content to simulated speech, and wherein the processor is configured to cause the speaker to audibly present to the user the simulated speech corresponding with the original discrete portion of the content simultaneously with the visual presentation of the text corresponding with the original discrete portion of the content prior to the original discrete portion of the content being audibly repeated by the user;
a microphone in communication with the processor and configured to record an audibly repeated version of the original discrete portion of the content from the user;
a speech-to-text engine in communication with the processor and the microphone, wherein the speech-to-text engine is configured to convert the original discrete portion of the content after being audibly repeated by the user and recorded by the microphone to text, and wherein the processor is configured to cause the display to visually present the text corresponding with the audibly repeated version of the original discrete portion of the content together with a response indicative of accuracy;
wherein, after the original discrete portion of the content has been audibly repeated by the user, the processor is further configured to conduct an accuracy analysis of the audibly repeated version of the original discrete portion of the content by comparing the text corresponding with the audibly repeated version of the original discrete portion of the content with the text corresponding with the original discrete portion of the content, the accuracy analysis including the processor calculating a percentage accuracy from the comparison, the percentage accuracy being a percentage of correct words in the text corresponding with the audibly repeated version of the original discrete portion of the content relative to the text corresponding with the original discrete portion of the content, and wherein the processor is further configured to cause the display to visually present the next discrete portion of the content as text corresponding with the next discrete portion of the content on the display upon one of i) the quantity of repetitions of the original discrete portion of the content to be presented to the user being reached, and ii) the percentage accuracy threshold having been exceeded by the percentage accuracy calculated by the processor, and wherein the text corresponding with the next discrete portion of the content is shown compiled together on the display with the text corresponding with the original discrete portion of the content where compilation is selected by the user with the human interface.

2. The system of claim 1, wherein the human interface device includes a keyboard in communication with the processor, the keyboard permitting the user to select the content, provide the content, set the accuracy threshold, and identify the original discrete portion of the content for memorization.

3. The system of claim 1, wherein the human interface device includes a mouse in communication with the processor, the mouse permitting the user to select the content, provide the content, set the accuracy threshold, and identify the original discrete portion of the content for memorization.

4. The system of claim 1, wherein the human interface device is integral with the display, the human interface and the display provided together as a touch screen in communication with the processor, the touch screen permitting the user to select the content, provide the content, set the accuracy threshold, and identify the original discrete portion of the content for memorization.

5. A method for memorization, comprising the steps of:
(a) providing a system for memorization of content, the system including a human interface for selecting the content to be memorized and for inputting a user predetermined i) quantity of repetitions of an original discrete portion of the content to be presented to the user prior to the user progressing to a next discrete portion of the content, and ii) percentage accuracy threshold, a memory on which the content to be memorized is stored, wherein the memory is a tangible computer readable medium with an instruction set and at least one database embodied thereon, a processor in communication with the human interface and the memory, a display in communication with the processor, wherein the processor is configured to cause the display to visually present the original discrete portion of the content as text corresponding with the original discrete portion of the content prior to the original discrete portion of the content being audibly repeated by the user, a speaker in communication with the processor, a text-to-speech engine in communication with the processor, wherein the text-to-speech engine is configured to convert the text corresponding with the original discrete portion of the content to simulated speech, and wherein the processor is configured to cause the speaker to audibly present to the user the simulated speech corresponding with the original discrete portion of the content simultaneously with the visual presentation of the text corresponding with the original discrete portion of the content prior to the original discrete portion of the content being audibly repeated by the user, a microphone in communication with the processor and configured to record an audibly repeated version of the original discrete portion of the content from the user, a speech-to-text engine in communication with the processor and the microphone, wherein the speech-to-text engine is configured to convert the original discrete portion of the content after being audibly repeated by the user and recorded by the microphone to text, and wherein the processor is configured to cause the display to visually present the text corresponding with the audibly repeated version of the original discrete portion of the content together with a response indicative of accuracy, wherein, after the original discrete portion of the content has been audibly repeated by the user, the processor is further configured to conduct an accuracy analysis of the audibly repeated version of the original discrete portion of the content by comparing the text corresponding with the audibly repeated version of the original discrete portion of the content with the text corresponding with the original discrete portion of the content, the accuracy analysis including the processor calculating a percentage accuracy from the comparison, the percentage accuracy being a percentage of correct words in the text corresponding with the audibly repeated version of the original discrete portion of the content relative to the text corresponding with the original discrete portion of the content, and wherein the processor is further configured to cause the display to visually present the next discrete portion of the content as text corresponding with the next discrete portion of the content on the display upon one of i) the quantity of repetitions of the original discrete portion of the content to be presented to the user being reached, and ii) the percentage accuracy threshold having been exceeded by the percentage accuracy calculated by the processor, and wherein the text corresponding with the next discrete portion of the content is shown compiled together on the display with the text corresponding with the original discrete portion of the content where compilation is selected by the user with the human interface;

b) selecting, by the human interface, the original discrete portion of the content for memorization;

c) inputting, by the human interface, the percentage accuracy threshold;

d) inputting, by the human interface, the quantity of repetitions;

e) visually presenting on the display, by the processor, the text corresponding with the original discrete portion of the content;

f) audibly presenting to the user with the speaker, by the processor, the simulated speech corresponding with the original discrete portion of the content;

g) recording, by the microphone, the audibly repeated version of the original discrete portion of the content from the user; and h) conducting, by the processor, the accuracy analysis of the audibly repeated version of the original discrete portion of the content by comparing the text corresponding with the audibly repeated version of the original discrete portion of the content with the text corresponding with the original discrete portion of the content; and i) comparing, by the processor, the percentage accuracy to the accuracy threshold, and where either the accuracy threshold is exceeded or the quantity of repetitions has been reached, repeating steps (e)-(h) with the next discrete portion instead of the original discrete portion of the content, whereby memorization of the content is facilitated.

6. The method of claim 5, further comprising the steps of:

repeating the steps (e)-(h) for multiple additional discrete portions upon satisfying the accuracy threshold; and compiling, by the processor, the original discrete portion with the multiple discrete portions for visually presenting on the display.

7. The method of claim 5, further comprising the step of the processor notifying the user of the percentage accuracy by visually presenting the percentage accuracy on the display.

* * * * *